(12) United States Patent
Ogawa

(10) Patent No.: US 11,019,227 B2
(45) Date of Patent: May 25, 2021

(54) STORAGE CONTROL APPARATUS EQUIPPED WITH STORAGE DEVICE, METHOD OF CONTROLLING SAME, AND STORAGE MEDIUM

(71) Applicant: CANON KABUSHIKI KAISHA, Tokyo (JP)

(72) Inventor: Tatsuya Ogawa, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/720,662

(22) Filed: Dec. 19, 2019

(65) Prior Publication Data
US 2020/0213454 A1    Jul. 2, 2020

(30) Foreign Application Priority Data

Dec. 28, 2018  (JP) .............................. JP2018-247763

(51) Int. Cl.
*H04N 1/00* (2006.01)
*H04N 1/32* (2006.01)
*G11B 19/20* (2006.01)

(52) U.S. Cl.
CPC ..... *H04N 1/00082* (2013.01); *G11B 19/2009* (2013.01); *H04N 1/00037* (2013.01); *H04N 1/32358* (2013.01)

(58) Field of Classification Search
CPC .......... H04N 1/00082; H04N 1/32358; H04N 1/00037; G11B 19/2009; G11B 19/20

USPC ........................................................ 358/1.13
See application file for complete search history.

(56) References Cited

U.S. PATENT DOCUMENTS

| | | | | |
|---|---|---|---|---|
| 5,277,504 A | * | 1/1994 | Takeda ..................... | B41J 35/36 242/344 |
| 6,924,901 B1 | * | 8/2005 | Otsubo .................... | B41J 29/38 340/539.3 |
| 2002/0186395 A1 | * | 12/2002 | Katsu ..................... | G06K 15/02 358/1.13 |
| 2009/0067083 A1 | * | 3/2009 | Ikenoue ............. | H04N 1/00896 360/75 |
| 2017/0041481 A1 | * | 2/2017 | Hikichi .............. | H04N 1/33346 |

FOREIGN PATENT DOCUMENTS

JP        H08138312 A    5/1996

* cited by examiner

*Primary Examiner* — Allen H Nguyen
(74) *Attorney, Agent, or Firm* — Rossi, Kimms & McDowell LLP

(57) ABSTRACT

A storage control apparatus capable of suppressing reduction of the service life of a storage device, caused due to increase of the number of times of ON/OFF operation of a spindle motor, while suppressing occurrence of accidental failure of the spindle motor. The storage control apparatus is equipped with an HDD including a magnetic disk and the spindle motor for rotating the magnetic disk. A value indicating a use state of the storage control apparatus is acquired, and the operation mode of the HDD is set, based on the acquired value, to one of a suppression operation mode for suppressing the total rotation time of the spindle motor and a normal operation mode for suppressing the number of times of ON/OFF operation of the spindle motor.

10 Claims, 9 Drawing Sheets

STORAGE CONTROL APPARATUS EQUIPPED WITH STORAGE DEVICE, METHOD OF CONTROLLING SAME, AND STORAGE MEDIUM

BACKGROUND OF THE INVENTION

Field of the Invention

The present invention relates to a storage control apparatus, a method of controlling the same, and a storage medium, and more particularly to a storage control apparatus equipped with a storage device, a method of controlling the same, and a storage medium.

Description of the Related Art

There is known an image forming apparatus as a storage control apparatus equipped with an HDD which is a storage device. The image forming apparatus stores e.g. programs, image data used for job processing, log data indicating operating states, states of consumables, etc., of the image forming apparatus, and system management data in the HDD. The HDD is formed by a disk as a magnetic storage medium, a spindle motor for rotating the disk, a head that reads/writes data, and a seek motor for driving the head. In the HDD, data is read out from or written into the disk by moving the head to a position above the disk rotating at high speed to access a storage area of the disk (this operation is referred to as "load"). When the loading operation is completed, the HDD retracts the head from the position above the disk to a predetermined position (home position) (this operation is referred to as "unload").

Causes of failure of the HDD include the total rotation time of the spindle motor and the rate of occurrence of accidental failure of the spindle motor rises in proportion to the increase of the total rotation time of the spindle motor. To suppress occurrence of accidental failure of the spindle motor, for example, in a conventional HDD, driving of the spindle motor is stopped in accordance with the unloading operation after reading/writing data (see e.g. Japanese Laid-Open Patent Publication (Kokai) No. H08-138312).

On the image forming apparatus, a plurality of restrictions associated with the service life of devices installed in the image forming apparatus are defined, and one of them is a restriction concerning the number of times of ON/OFF operation of the spindle motor of the HDD. As in the above-mentioned conventional HDD, when the spindle motor is stopped in accordance with the unloading operation after reading/writing data, even though the occurrence of accidental failure of the spindle motor can be suppressed, the number of times of ON/OFF operation of the spindle motor is increased, which reduces the service life of the HDD.

SUMMARY OF THE INVENTION

The present invention provides a storage control apparatus capable of suppressing reduction of the service life of a storage device, which is caused by increase of the number of times of ON/OFF operation of a spindle motor, while suppressing occurrence of accidental failure of the spindle motor, a method of controlling the same, and a storage medium.

In a first aspect of the present invention, there is provided a storage control apparatus equipped with a storage device including a magnetic disk and a control motor for rotating the magnetic disk, comprising an acquisition unit configured to acquire a value indicating a use state of the storage control apparatus, and a mode control unit configured to control an operation mode of the storage device, wherein the mode control unit switches the operation mode of the storage device to one of a first mode for suppressing a total rotation time of the control motor and a second mode for suppressing the number of times of ON/OFF operation of the control motor, based on the acquired value indicating the use state of the storage control apparatus.

In a second aspect of the present invention, there is provided a method of controlling a storage control apparatus equipped with a storage device including a magnetic disk and a control motor for rotating the magnetic disk, comprising acquiring a value indicating a use state of the storage control apparatus, and controlling an operation mode of the storage device, wherein said controlling of the operation mode of the storage device includes switching the operation mode of the storage device to one of a first mode for suppressing a total rotation time of the control motor and a second mode for suppressing the number of times of ON/OFF operation of the control motor, based on the acquired value indicating the use state of the storage control apparatus.

In a third aspect of the present invention, there is provided a non-transitory computer-readable storage medium storing a computer-executable program for executing a method of controlling a storage control apparatus equipped with a storage device including a magnetic disk and a control motor for rotating the magnetic disk, wherein the method comprises acquiring a value indicating a use state of the storage control apparatus, and controlling an operation mode of the storage device, wherein said controlling of the operation mode of the storage device includes switching the operation mode of the storage device to one of a first mode for suppressing a total rotation time of the control motor and a second mode for suppressing the number of times of ON/OFF operation of the control motor, based on the acquired value indicating the use state of the storage control apparatus.

According to the present invention, it is possible to suppress reduction of the service life of a storage device, which is caused by increase of the number of times of ON/OFF operation of the spindle motor, while suppressing occurrence of accidental failure of the spindle motor.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

In an embodiment described hereafter, the present invention is applied to an image forming apparatus as a storage control apparatus, but the present invention is not limitedly applied to the image forming apparatus. For example, the present invention may be applied to an information processing apparats equipped with an HDD, such as a PC, a tablet terminal, and a mobile terminal.

Figure 1:
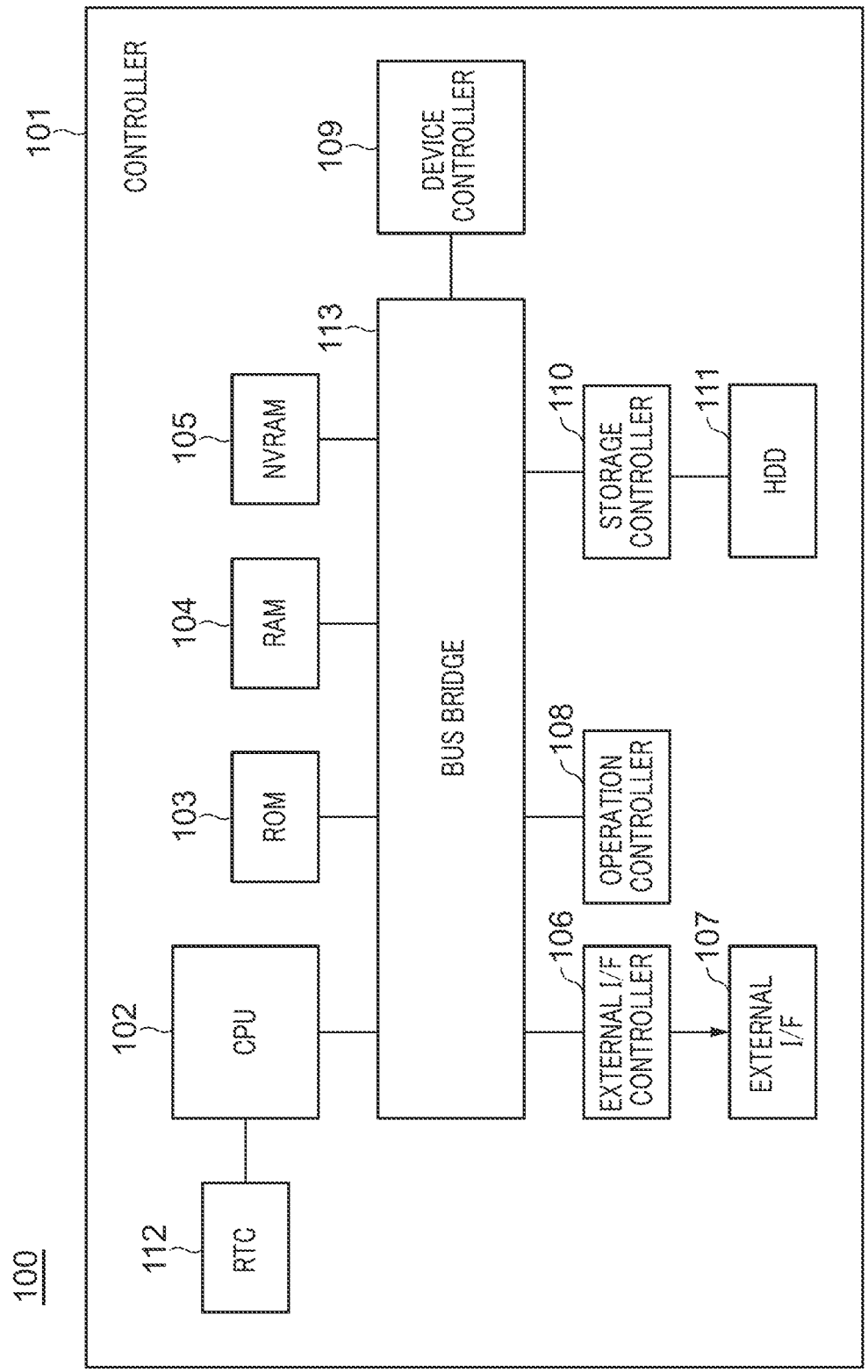
FIG. 1 is a schematic block diagram of a controller provided in an image forming apparatus as a storage control apparatus according to an embodiment of the present invention.

FIG. 1 is a schematic block diagram of a controller 101 provided in an image forming apparatus 100 as a storage control apparatus according to the embodiment of the present invention.

Referring to FIG. 1, the controller 101 includes a CPU 102, a ROM 103, a RAM 104, an NVRAM 105, an external interface controller 106, an external interface 107, an operation controller 108, a device controller 109, a storage controller 110, an HDD 111, and an RTC (Real Time Clock) 112. The CPU 102, the ROM 103, the RAM 104, the NVRAM 105, the external interface controller 106, the operation controller 108, the device controller 109, and the storage controller 110 are interconnected via a bus bridge 113.

The image forming apparatus 100 is equipped with a plurality of functions, such as a print function and a scan function, and executes a job involving an image formation process. The controller 101 controls modules for realizing the functions equipped in the image forming apparatus 100, based on an instruction received via a console section (not shown) or from an external apparatus (not shown). For example, the controller 101 controls a scanner section (not shown) of the image forming apparatus 100 to read an original placed on the scanner section and generate image data. Further, the controller 101 controls a document feeder (not shown) of the image forming apparatus 100 to convey a sheet to a printer section (not shown) of the image forming apparatus 100 and then controls the printer section to print the above-mentioned image data on the sheet. Further, the controller 101 controls a folding section (not shown) and a finisher section (not shown) to perform post-processing, such as stapling and punching, on the sheet on which the image data has been printed. The CPU 102 is controlled by an OS (Operating System). The CPU 102 controls the modules connected via the bus bridge 113 by executing programs stored in the ROM 103.

The ROM 103 stores the programs to be executed by the CPU 102 and a time table used to manage a loaded state of the HDD 111. The time table includes e.g. a plurality of load-maintaining times. The load-maintaining time refers to a time period over which the HDD 111 is caused to maintain a loaded state. When conditions for resetting the load-maintaining time are satisfied, the CPU 102 refers to the time table. The CPU 102 selects one load-maintaining time out of the plurality of load-maintaining times included in this time table, and stores the selected load-maintaining time in the NVRAM 105. The CPU 102 controls the loaded state of the HDD 111 based on the load-maintaining time stored in the NVRAM 105. The RAM 104 is used as a work area for operations executed for control. The NVRAM 105 stores e.g. the above-mentioned load-maintaining time and an HDD lifetime operation number. The HDD lifetime operation number refers to an upper limit value of the number of times of ON/OFF operation of a spindle motor 206, described hereinafter with reference to FIG. 2, which is defined as a restriction on the service life of the HDD 111. Further, the NVRAM 105 stores a first job execution time information indicating a time at which a first job involving access to the HDD 111 was executed after the startup of the image forming apparatus 100.

The external interface controller 106 is connected to the external interface 107. The external interface controller 106 controls data communication with an external apparatus (not shown) connected to the external interface 107. The external interface 107 is an interface for connection between the image forming apparatus 100 and an external apparatus. For example, the external interface 107 acquires print data to be printed from an external apparatus, and further, transmits image data generated by the scanner section to an external apparatus. The operation controller 108 controls the console section of the image forming apparatus 100. The device controller 109 controls the modules connected to the controller 101, for example, the above-mentioned scanner section, document feeder, printer section, folding section, and finisher section.

The storage controller 110 controls reading/writing of data from/into the HDD 111. The HDD 111 stores main programs including the OS of the CPU 102, and image data. The image data includes e.g. image data generated by the scanner section, image data received from an external apparatus, and image data edited by a user via the console section. Further, the HDD 111 stores application programs and preference data. The preference data includes information on user settings, such as the settings of the display of the console section and the setting of a time to shift the image forming apparatus 100 to a power saving mode, and registration information, such as an address book. The CPU 102 can access the HDD 111 via the bus bridge 113 and the storage controller 110.

The RTC 112 acquires a current time and notifies the CPU 102 of the acquired current time. The CPU 102 calculates an operation time (T) of the image forming apparatus 100 based on the time indicated by the first job execution time information stored in the NVRAM 105 and the current time notified from the RTC 112. The operation time (T) of the image forming apparatus 100 refers to a time period which elapsed from execution of the first job involving access to the HDD 111 after the startup of the image forming apparatus 100.

Figure 2:
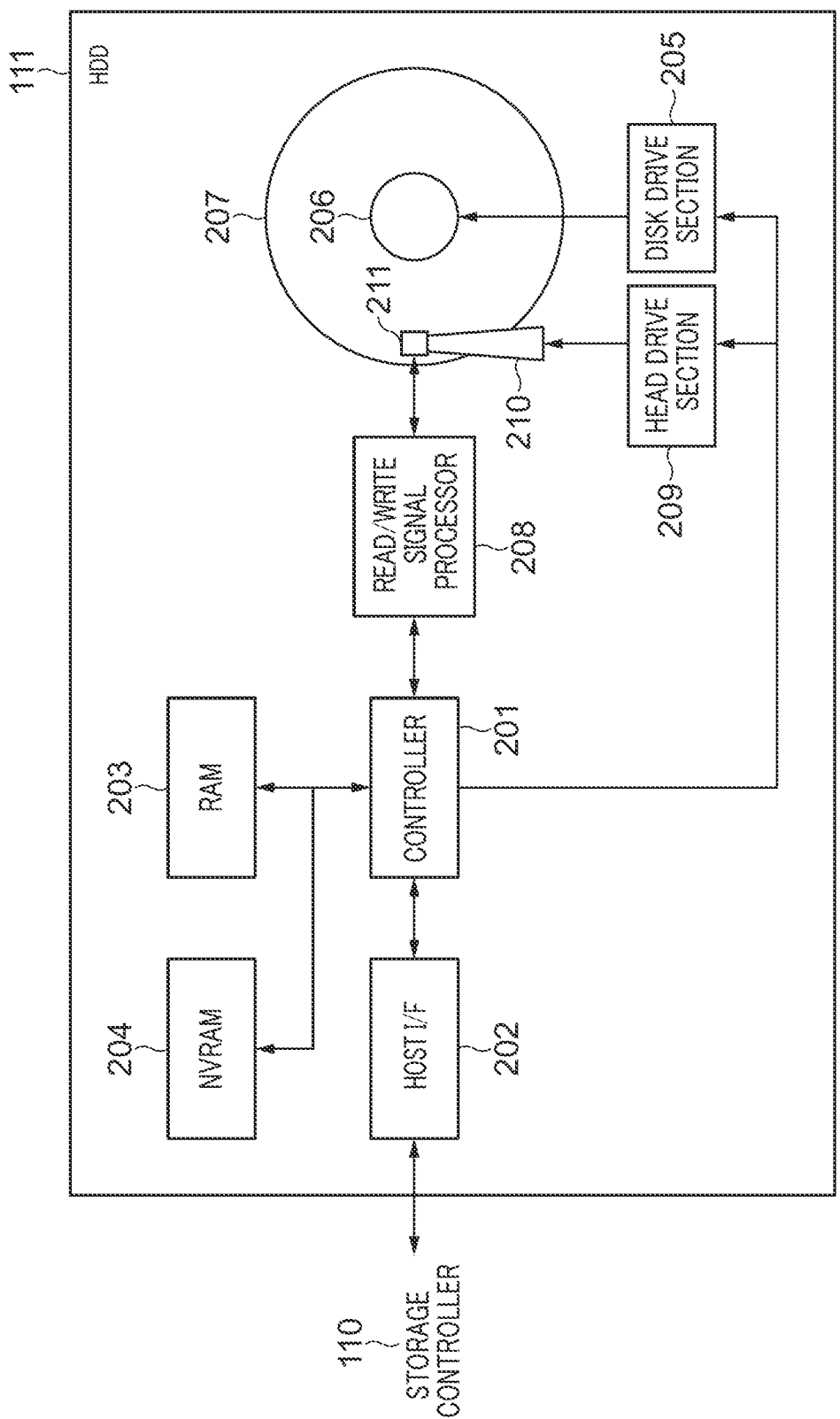
FIG. 2 is a schematic block diagram of an HDD appearing in FIG. 1.

FIG. 2 is a schematic block diagram of the HDD 111 appearing in FIG. 1. Referring to FIG. 2, the HDD 111 includes a controller 201, a host interface 202, a RAM 203, an NVRAM 204, a disk drive section 205, the spindle motor 206 (control motor), a magnetic disk 207, a read/write signal processor 208, a head drive section 209, an arm 210, and a magnetic head 211.

The controller 201 controls the overall operation of the HDD 111. The host interface 202 is a module for communication with the storage controller 110, and is e.g. a SATA (Serial AT Attachment) interface. The RAM 203 is used as a work area for the controller 201. The NVRAM 204 stores S.M.A.R.T. information, etc. The S.M.A.R.T. information includes, for example, the number of times of ON/OFF operation of the spindle motor 206, the number of times of loading/unloading operation, and the number of times of power-on operation. The number of times of ON/OFF operation of the spindle motor 206 is the number of times obtained by adding up the number of times of turning on the spindle motor 206 and the number of times of turning off the spindle motor 206. The number of times of loading/unloading operation is the number of times obtained by adding up the number of times of loading execution and the number of times of unloading execution. The disk drive section 205 controls driving of the spindle motor 206.

The spindle motor 206 rotates the magnetic disk 207. In the HDD 111 of the present embodiment, as the operation mode of the spindle motor 206, one of a suppression operation mode and a normal operation mode is set based on criterion information 301, described hereinafter with reference to FIG. 3. In the suppression operation mode, the disk drive section 205 stops driving of the spindle motor 206 when predetermined stop conditions, described hereinafter, are satisfied. In the normal operation mode, the disk drive section 205 continues to drive the spindle motor 206 as long as electric power is supplied to the HDD 111. The magnetic disk 207 is a nonvolatile storage medium and is formed by a plurality of sectors each storing data. The read/write signal processor 208 generates information used for data read/write processing. The data read/write processing includes e.g. processing for reading data from the above-mentioned sector, processing for writing data into the sector, and processing for deleting data written in the sector. The head drive section 209 controls driving of the arm 210. The magnetic head 211 is disposed on a tip end of the arm 210.

Upon supply of electric power to the HDD 111, the controller 201 executes a process for starting the HDD 111. More specifically, the controller 201 performs an initialization operation and then performs drive diagnosis of the head drive section 209 and the disk drive section 205. If no abnormality is detected by the drive diagnosis, the controller 201 controls the disk drive section 205 to drive the spindle motor 206. With this, the magnetic disk 207 is rotated. When the rotational speed of the magnetic disk 207 is stabilized, the controller 201 controls the head drive section 209 to move the magnetic head 211 to a position above the magnetic disk 207 and cause the magnetic head 211 to read system data recorded in the magnetic disk 207, whereby the process for starting the HDD 111 is completed.

After completion of the process for starting the HDD 111, upon receipt of a SATA command from the storage controller 110, the controller 201 performs the load processing. In the load processing, the controller 201 controls the head drive section 209 to move the magnetic head 211 from the home position outside the magnetic disk 207 to a specific sector on the magnetic disk 207, indicated by the SATA command. In the following description, a state in which the magnetic head 211 is positioned above the magnetic disk 207 is referred to as the loaded state. The magnetic head 211 performs the data read/write processing on the sector to which the magnetic head 211 has been moved.

When a job involving the data read/write processing on the magnetic disk 207 has been completed and also the load-maintaining time has elapsed, the controller 201 performs the unload processing for moving the magnetic head 211 to the home position outside the magnetic disk 207. In the following description, a state in which the magnetic head 211 is positioned in the home position is referred to as the unloaded state. Further, the controller 201 updates the S.M.A.R.T. information stored in the NVRAM 204. More specifically, the controller 201 increments the number of times of loading/unloading operation included in the S.M.A.R.T. information. The updated S.M.A.R.T. information is sent to the storage controller 110.

Figure 3:
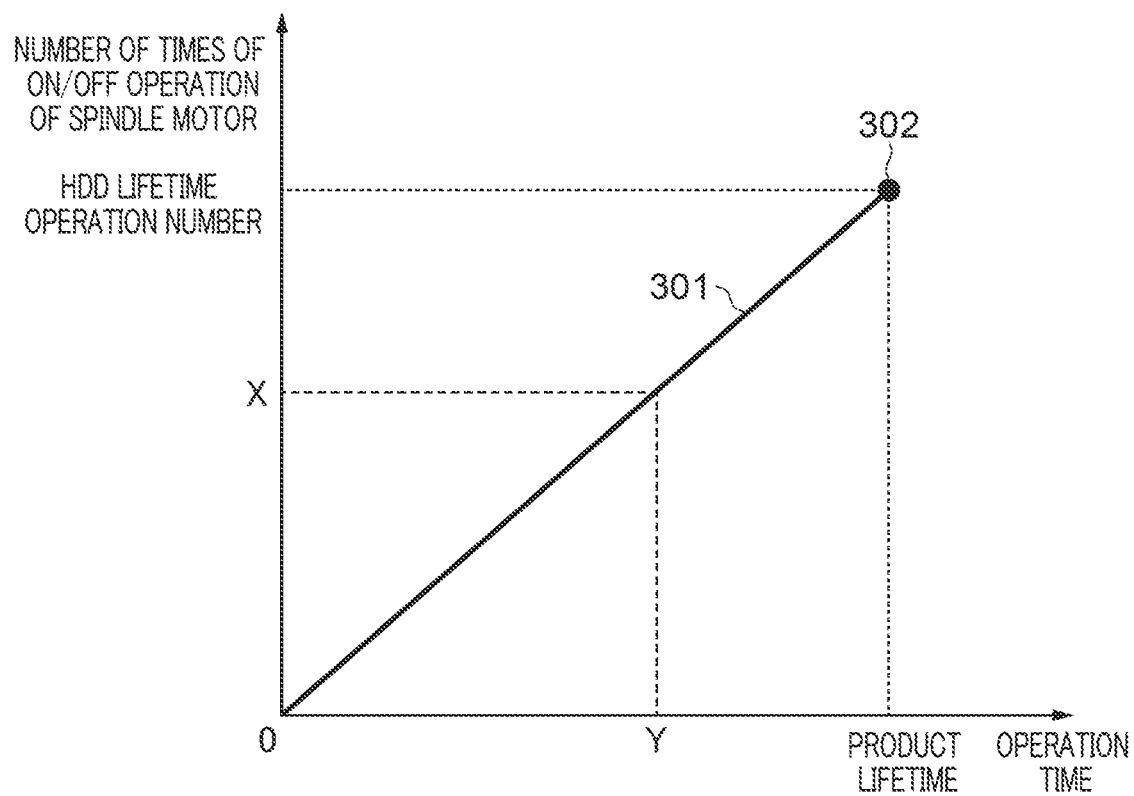
FIG. 3 is a diagram showing criterion information for use in the switching control of an operation mode of a spindle motor appearing in FIG. 2.

FIG. 3 is a diagram showing the criterion information 301 for use in the switching control of the operation mode of the spindle motor 206 appearing in FIG. 2. Referring to FIG. 3, the horizontal axis represents the operation time of the image forming apparatus 100 and the vertical axis represents the number of times of ON/OFF operation of the spindle motor 206. The criterion information 301 is expressed by a straight line connecting between the origin and a point 302 indicated by an upper limit value of the operation time, which is defined as a restriction on the product lifetime of the image forming apparatus 100, and the HDD lifetime operation number.

The criterion information 301 is used as a criterion for determining whether or not a condition of the product lifetime of the image forming apparatus 100 is satisfied. In the present embodiment, when controlling the switching of the operation mode of the spindle motor 206, one determination criterion time is set out of a plurality of determination criterion times forming the criterion information 301. More specifically, a value of the X-axis corresponding to a value of the Y-axis of the criterion information 301 indicating the number of times of ON/OFF operation of the spindle motor 206 at that time is set as the determination criterion time. The determination criterion time is calculated by the following equation (1):

$$\text{determination criterion time} = \text{product lifetime} \div \text{HDD lifetime operation number} \times \text{number of times of ON/OFF operation of the spindle motor } 206 \quad (1)$$

The image forming apparatus 100 switches the operation mode of the spindle motor 206 based on a result of comparison between the operation time (T) of the image forming apparatus 100 and the determination criterion time. For example, in a case where the operation time (T) of the image forming apparatus 100 is longer than the determination criterion time (Y) corresponding to the number of times of ON/OFF operation (X) of the spindle motor 206, it is determined that the number of times of ON/OFF operation of the spindle motor 206 is changing at a rate at which the number of times of ON/OFF operation of the spindle motor 206 is not expected to reach the HDD lifetime operation number before the image forming apparatus 100 reaches its product lifetime. In this case, the image forming apparatus 100 gives priority to suppression of accidental failure of the spindle motor 206 by suppressing the total rotation time of the spindle motor 206, and changes the operation mode of the spindle motor 206 to the suppression operation mode.

Figure 4:
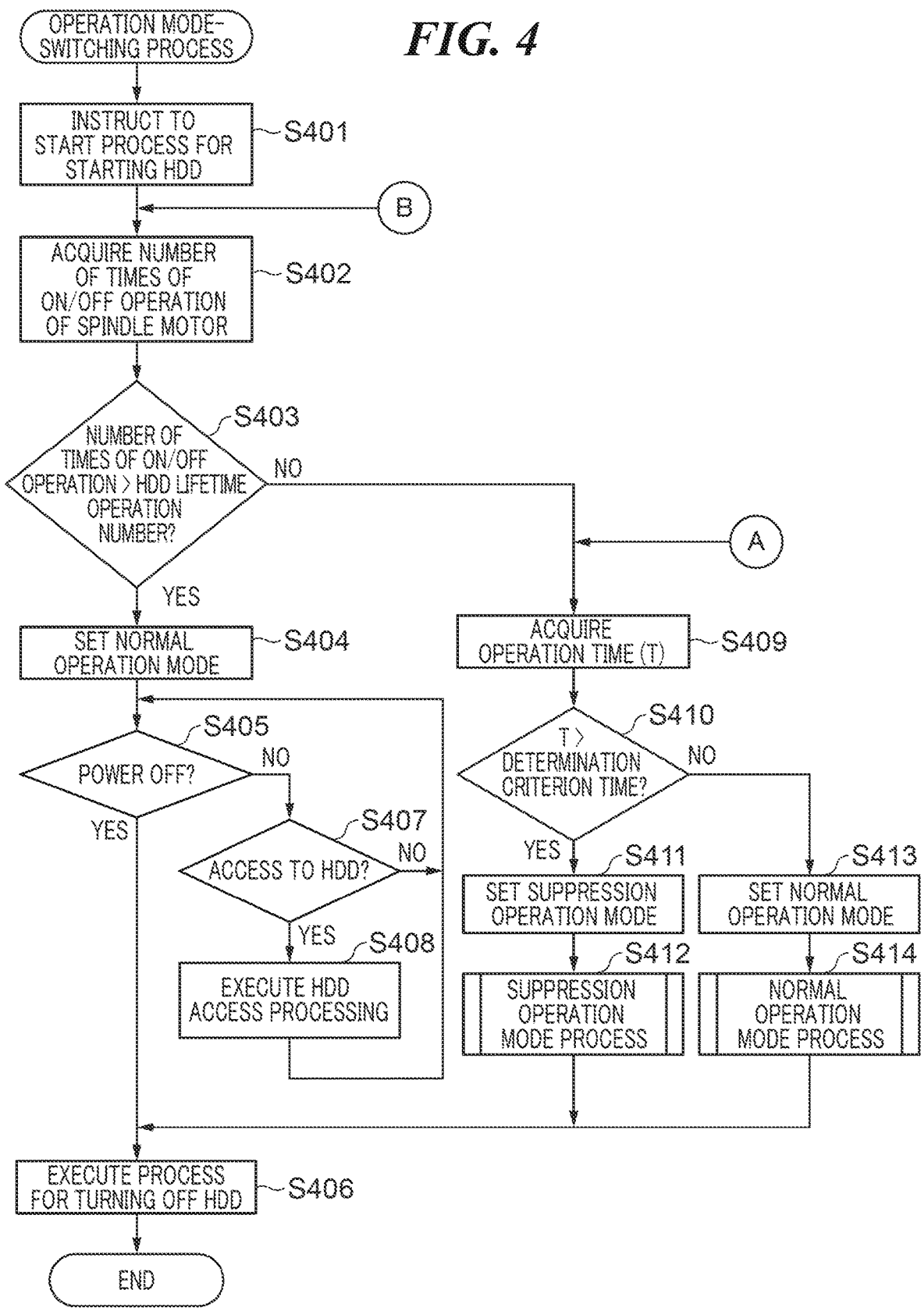
FIG. 4 is a flowchart of an operation mode-switching process performed by the image forming apparatus shown in FIG. 1.

FIG. 4 is a flowchart of an operation mode-switching process performed by the image forming apparatus 100 shown in FIG. 1. The process in FIG. 4 is performed by the CPU 102 that executes an associated program stored in the ROM 103. The process in FIG. 4 is executed when electric power is supplied to the HDD 111. Note that in the process in FIG. 4, it is assumed that power supply to the HDD 111 is stopped in a case where a user provides an instruction for turning off the image forming apparatus 100 and otherwise electric power is supplied to the HDD 111.

Referring to FIG. 4, the CPU 102 instructs the controller 201 to start the process for starting the HDD 111 (step S401). The controller 201 having received the instruction starts the above-described process for starting the HDD 111. Further, the controller 201 transmits the S.M.A.R.T. information, in which the number of times of ON/OFF operation of the spindle motor 206 has been updated, to the CPU 102. Then, the CPU 102 acquires the number of times of ON/OFF operation of the spindle motor 206 from the received S.M.A.R.T. information (step S402) (operation of an ON/OFF operation number acquisition unit). Then, the CPU 102 determines whether or not the acquired number of times of ON/OFF operation of the spindle motor 206 exceeds the HDD lifetime operation number stored in the NVRAM 105 (step S403).

If it is determined in the step S403 that the acquired number of times of ON/OFF operation of the spindle motor 206 exceeds the HDD lifetime operation number, the CPU 102 sets the operation mode of the spindle motor 206 to the normal operation mode (step S404) (operation of a mode control unit). In the normal operation mode, the spindle motor 206 continues to be driven as long as electric power is supplied to the HDD 111, and hence the number of times of ON/OFF operation of the spindle motor 206 is suppressed. Then, the CPU 102 determines whether or not the user has provided an instruction for turning off the image forming apparatus 100 (step S405).

If it is determined in the step S405 that the user has provided an instruction for turning off the image forming apparatus 100, the CPU 102 executes a process for turning off the HDD 111 (step S406). More specifically, when the CPU 102 determines that the controller 201 is not accessing the magnetic disk 207, the CPU 102 executes unmount processing for the controller 201. Then, the CPU 102 executes processing for shutting down the HDD 111, followed by terminating the present process.

If it is determined in the step S405 that the user has not provided an instruction for turning off the image forming apparatus 100, the CPU 102 determines whether or not to access the HDD 111 (step S407).

If it is determined in the step S407 that the CPU 102 is not to access the HDD 111, the CPU 102 returns to the step S405. If it is determined in the step S407 that the CPU 102 is to access the HDD 111, the CPU 102 executes HDD access processing (step S408). The controller 201 of the HDD 111 accessed from the CPU 102 drives the head drive section 209 to move the magnetic head 211 to a position above the magnetic disk 207 and causes the magnetic head 211 to execute the data read/write processing. When the data read/write processing is terminated, the controller 201 drives the head drive section 209 to retract the magnetic head 211 to the home position. Then, the CPU 102 returns to the step S405.

If it is determined in the step S403 that the acquired number of times of ON/OFF operation of the spindle motor 206 does not exceed the HDD lifetime operation number, the CPU 102 acquires a value indicating the use state of the image forming apparatus 100. More specifically, the CPU 102 acquires the operation time (T) of the image forming apparatus 100 (step S409). In the step S409, the CPU 102 calculates the operation time (T) of the image forming apparatus 100 based on the first job execution time information stored in the NVRAM 105 and the current time notified from the RTC 112. Then, the CPU 102 identifies a determination criterion time (Y) corresponding to the number of times of ON/OFF operation of the spindle motor 206, acquired in the step S402, from the criterion information 301. The CPU 102 determines whether or not the operation time (T) of the image forming apparatus 100 exceeds the identified determination criterion time (step S410).

If it is determined in the step S410 that the operation time (T) of the image forming apparatus 100 exceeds the identified determination criterion time (Y), it is supposed that the number of times of ON/OFF operation of the spindle motor 206 is changing at a rate at which the number of times of ON/OFF operation is not expected to reach the HDD lifetime operation number before the image forming apparatus 100 reaches the product lifetime. At this time, the CPU 102 sets the operation mode of the spindle motor 206 to the suppression operation mode for suppressing the total rotation time of the spindle motor 206 (step S411) (operation of the mode control unit). Then, the CPU 102 performs a suppression operation mode process, described hereinafter with reference to FIG. 5 (step S412), and executes the step S406 et seq.

If it is determined in the step S410 that the operation time (T) of the image forming apparatus 100 is not longer than the identified determination criterion time (Y), it is supposed that the number of times of ON/OFF operation of the spindle motor 206 (X) is changing at a rate at which the number of times of ON/OFF operation is expected to reach the HDD lifetime operation number before the image forming apparatus 100 reaches the product lifetime. At this time, the CPU 102 sets the operation mode of the spindle motor 206 to the normal operation mode for suppressing the number of times of ON/OFF operation of the HDD 111 (step S413) (operation of the mode control unit). Then, the CPU 102 performs a normal operation mode process, described hereinafter with reference to FIG. 6 (step S414), and executes the step S406 et seq.

Figure 5:
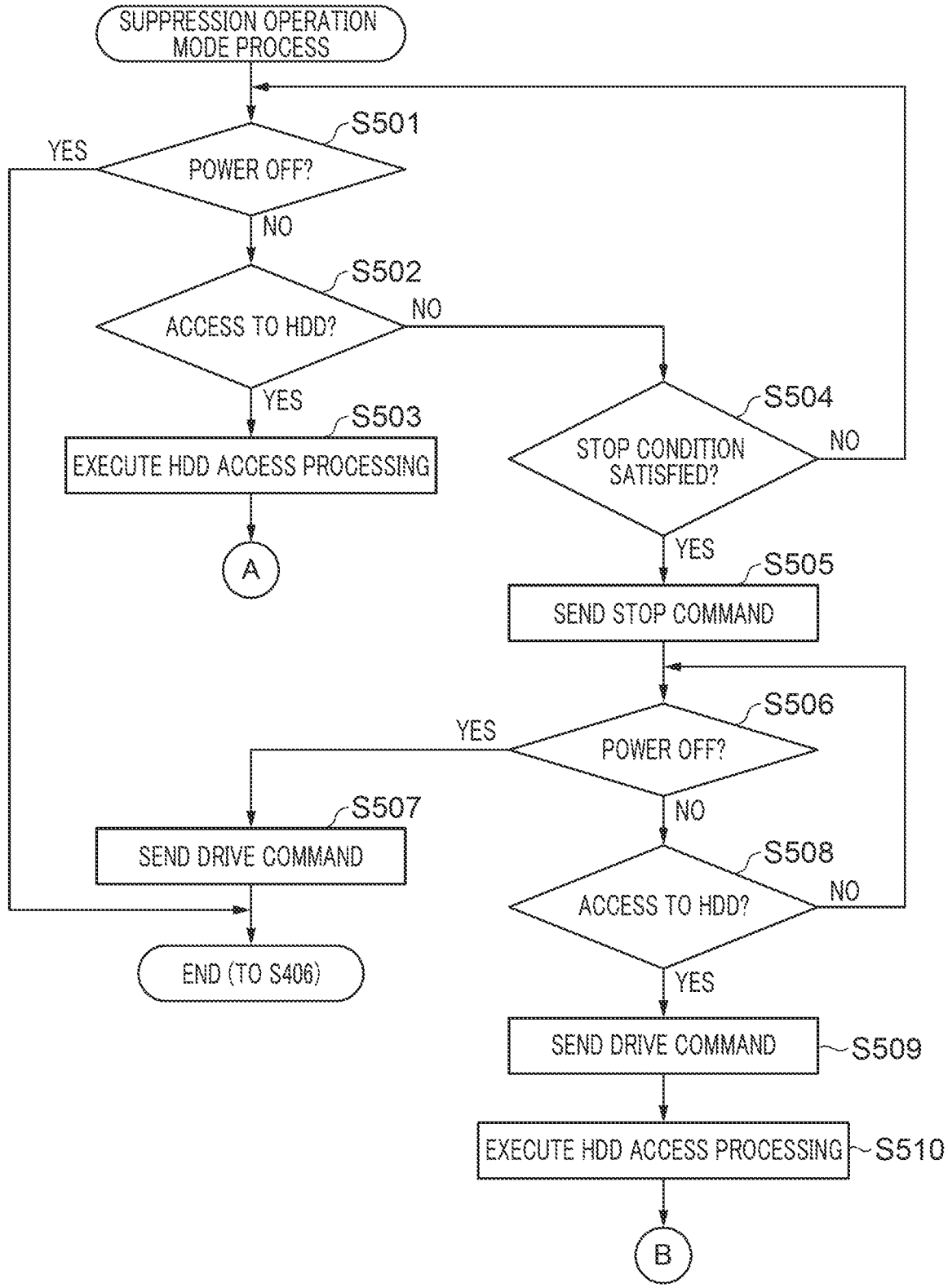
FIG. 5 is a flowchart of a suppression operation mode process in a step in FIG. 4.

FIG. 5 is a flowchart of the suppression operation mode process in the step S412 in FIG. 4.

Referring to FIG. 5, the CPU 102 determines whether or not the user has provided an instruction for turning off the image forming apparatus 100 (step S501).

If it is determined in the step S501 that the user has provided an instruction for turning off the image forming apparatus 100, the CPU 102 executes the step S406 et seq. If it is determined in the step S501 that the user has not provided an instruction for turning off the image forming apparatus 100, the CPU 102 determines whether or not to access the HDD 111 (step S502).

If it is determined in the step S502 that the CPU 102 is to access the HDD 111, the CPU 102 performs the above-mentioned HDD access processing (step S503), and executes the step S406 et seq.

If it is determined in the step S502 that the CPU 102 is not to access the HDD 111, the CPU 102 determines whether or not a condition for stopping the spindle motor 206 is satisfied (step S504). In the step S504, for example, in a case where a predetermined time set in advance has elapsed after the CPU 102 has accessed the HDD 111, or the image forming apparatus 100 has been shifted to a predetermined mode, the CPU 102 determines that the condition for stopping the spindle motor 206 is satisfied. On the other hand, in a case where neither of the above-mentioned conditions is satisfied, the CPU 102 determines that the condition for stopping the spindle motor 206 is not satisfied.

If it is determined in the step S504 that the condition for stopping the spindle motor 206 is not satisfied, the CPU 102 returns to the step S501. If it is determined in the step S504 that the condition for stopping the spindle motor 206 is satisfied, the CPU 102 sends a stop command for stopping the spindle motor 206 to the controller 201 (step S505). The controller 201 having received the stop command controls the disk drive section 205 to stop the spindle motor 206. Then, the CPU 102 determines whether or not the user has provided an instruction for turning off the image forming apparatus 100 (step S506).

If it is determined in the step S506 that the user has provided an instruction for turning off the image forming apparatus 100, the CPU 102 sends a drive command for driving the spindle motor 206, to the controller 201 (step S507). The controller 201 having received the drive command controls the disk drive section 205 to drive the spindle motor 206. Then, the CPU 102 executes the step S406 et seq.

If it is determined in the step S506 that the user has not provided an instruction for turning off the image forming apparatus 100, the CPU 102 determines whether or not to access the HDD 111 (step S508).

If it is determined in the step S508 that the CPU 102 is not to access the HDD 111, the CPU 102 returns to the step S506. If it is determined in the step S508 that the CPU 102 is to access the HDD 111, the CPU 102 sends the above-mentioned drive command to the controller 201 (step S509). The controller 201 having received the drive command controls the disk drive section 205 to drive the spindle motor 206. Then, the CPU 102 performs the above-described HDD access processing (step S510), and executes the step S402 et seq.

Figure 6:
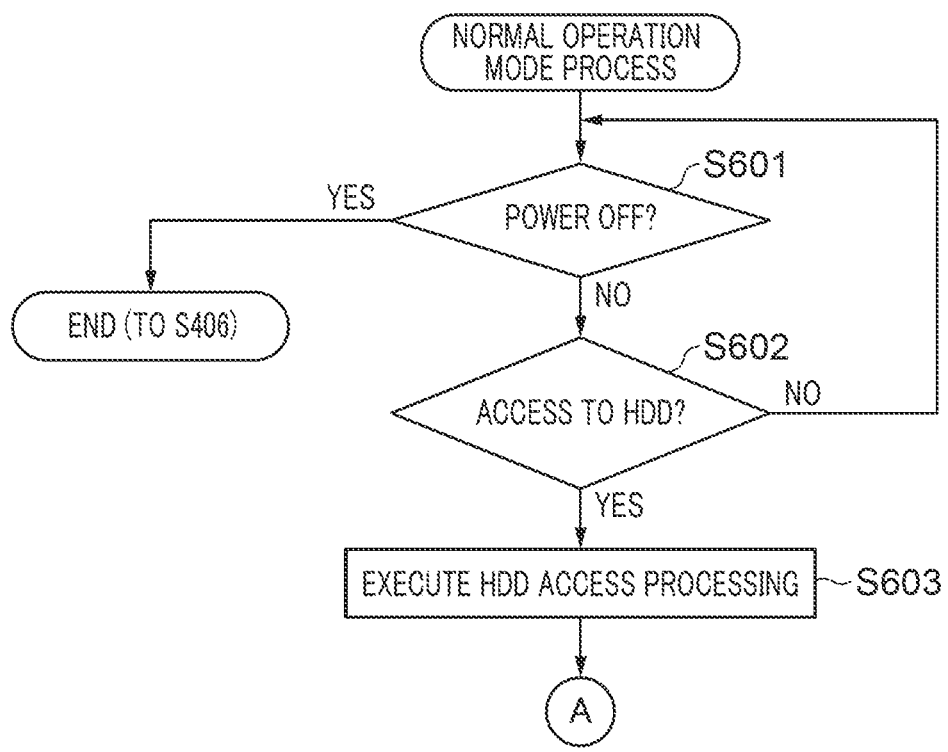
FIG. 6 is a flowchart of a normal operation mode process in a step in FIG. 4.

FIG. 6 is a flowchart of the normal operation mode process in the step S414 in FIG. 4.

Referring to FIG. 6, the CPU 102 determines whether or not the user has provided an instruction for turning off the image forming apparatus 100 (step S601).

If it is determined in the step S601 that the user has provided an instruction for turning off the image forming apparatus 100, the CPU 102 executes the step S406 et seq. If it is determined in the step S601 that the user has not provided an instruction for turning off the image forming apparatus 100, the CPU 102 determines whether or not to access the HDD 111 (step S602).

If it is determined in the step S602 that the CPU 102 is not to access the HDD 111, the CPU 102 returns to the step S601. If it is determined in the step S602 that the CPU 102 is to access the HDD 111, the CPU 102 performs the above-described HDD access processing (step S603), and executes the step S409 et seq.

According to the above-described embodiment, the operation mode of the spindle motor 206 is changed to one of the suppression operation mode and the normal operation mode based on the operation time (T) of the image forming apparatus 100. With this, it is possible to properly control suppression of the total rotation time of the spindle motor 206 and suppression of the number of times of ON/OFF operation of the spindle motor 206 according to the use state of the image forming apparatus 100. As a result, it is possible to suppress reduction of the service life of the HDD 111, caused by increase of the number of times of ON/OFF operation of the spindle motor 206, while suppressing occurrence of accidental failure of the spindle motor 206.

Further, in the above-described embodiment, in a case where the operation time (T) of the image forming apparatus 100 exceeds the determination criterion time, the operation mode of the spindle motor 206 is set to the suppression operation mode. That is, in a case where it is supposed that the number of times of ON/OFF operation of the spindle motor 206 is changing at a rate at which the number of times of ON/OFF operation of the spindle motor 206 is not expected to exceed the restriction related to the product lifetime of the image forming apparatus 100, the suppression operation mode for suppressing the total rotation time of the spindle motor 206 is set. With this, it is possible to suppress occurrence of accidental failure of the spindle motor 206 without markedly reducing the product lifetime of the image forming apparatus 100, more specifically, the service life of the HDD 111.

Further, in the above-described embodiment, in a case where the operation time (T) of the image forming apparatus 100 is not longer than the determination criterion time, the operation mode of the spindle motor 206 is set to the normal operation mode. That is, in a case where it is supposed that the number of times of ON/OFF operation of the spindle motor 206 is changing at a rate at which the number of times of ON/OFF operation of the spindle motor 206 is expected to exceed the restriction related to the product lifetime of the image forming apparatus 100, the normal operation mode for suppressing the number of times of ON/OFF operation of the HDD 111 is set. With this, it is possible to suppress reduction of the product lifetime of the image forming apparatus 100, more specifically, the service life of the HDD 111.

In the above-described embodiment, a determination criterion time corresponding to the acquired number of times of ON/OFF operation is identified out of the plurality of determination criterion times forming the criterion information 301, and it is determined whether or not the operation time (T) of the image forming apparatus 100 exceeds the identified determination criterion time. With this, in the determination processing for switching the operation mode of the spindle motor 206, it is possible to properly perform the determination according to the number of times of ON/OFF operation of the spindle motor 206.

In the above-described embodiment, in a case where the suppression operation mode is set, when the condition for stopping the spindle motor 206 is satisfied, the spindle motor 206 is stopped. With this, in the case where the suppression operation mode is set, it is possible to suppress occurrence of accidental failure of the spindle motor 206 by suppressing the total rotation time of the spindle motor 206.

Further, in the above-described embodiment, in a case where the normal operation mode is set, the spindle motor 206 continues to be driven as lone as electric power is supplied to the HDD 111. With this, in the case where the normal operation mode is set, it is possible to suppress reduction of the service life of the HDD 111, caused by increase of the number of times of ON/OFF operation of the spindle motor 206, by suppressing the number of times of ON/OFF operation of the spindle motor 206.

Although the present invention has been described using the above-described embodiment, the present invention is not limited to the above-described embodiment. For example, the number of times of ON/OFF operation of the spindle motor 206 may be acquired when the operation time (T) of the image forming apparatus 100 has reached a predetermined time set in advance. The CPU 102 identifies a determination criterion time which is the number of times of ON/OFF operation of the spindle motor 206, corresponding to the operation time (T) of the image forming apparatus 100, from the criterion information 301, and switches the operation mode of the spindle motor 206 based on a result of comparison between the acquired number of times of ON/OFF operation of the spindle motor 206 and the identified determination criterion time. For example, in a case where the acquired number of times of ON/OFF operation of the spindle motor 206 is not smaller than the identified determination criterion time, it is supposed that the number of times of ON/OFF operation of the spindle motor 206 is changing at a rate at which the number of times of ON/OFF operation of the spindle motor 206 is expected to exceed the restriction related to the product lifetime of the image forming apparatus 100. In this case, the CPU 102 sets the operation mode of the spindle motor 206 to the normal operation mode. On the other hand, in a case where the acquired number of times of ON/OFF operation of the spindle motor 206 is smaller than the identified determination criterion time, it is supposed that the number of times of ON/OFF operation of the spindle motor 206 is changing at a rate at which that the number of times of ON/OFF operation of the spindle motor 206 is not expected to reach the HDD lifetime operation number before the image forming apparatus 100 reaches the restriction related to the product lifetime of the image forming apparatus 100. In this case, the CPU 102 sets the operation mode of the spindle motor 206 to the suppression operation mode. Thus, it is possible to properly control the total rotation time of the spindle motor 206, which can be a cause of accidental failure of the spindle motor 206, and the number of times of ON/OFF operation of the spindle motor 206, which can be a cause of reduction of the service life of the HDD 111, according to the acquired number of times of ON/OFF operation of the spindle motor 206.

Further, in the above-described embodiment, the image forming apparatus 100 may be shifted to a deep sleep state when a predetermined shifting condition, set in advance, such as a condition that a user presses a power-saving button, is satisfied. When the image forming apparatus 100 is shifted to the deep sleep state, supply of electric power to the HDD 111 is stopped.

Figure 7:
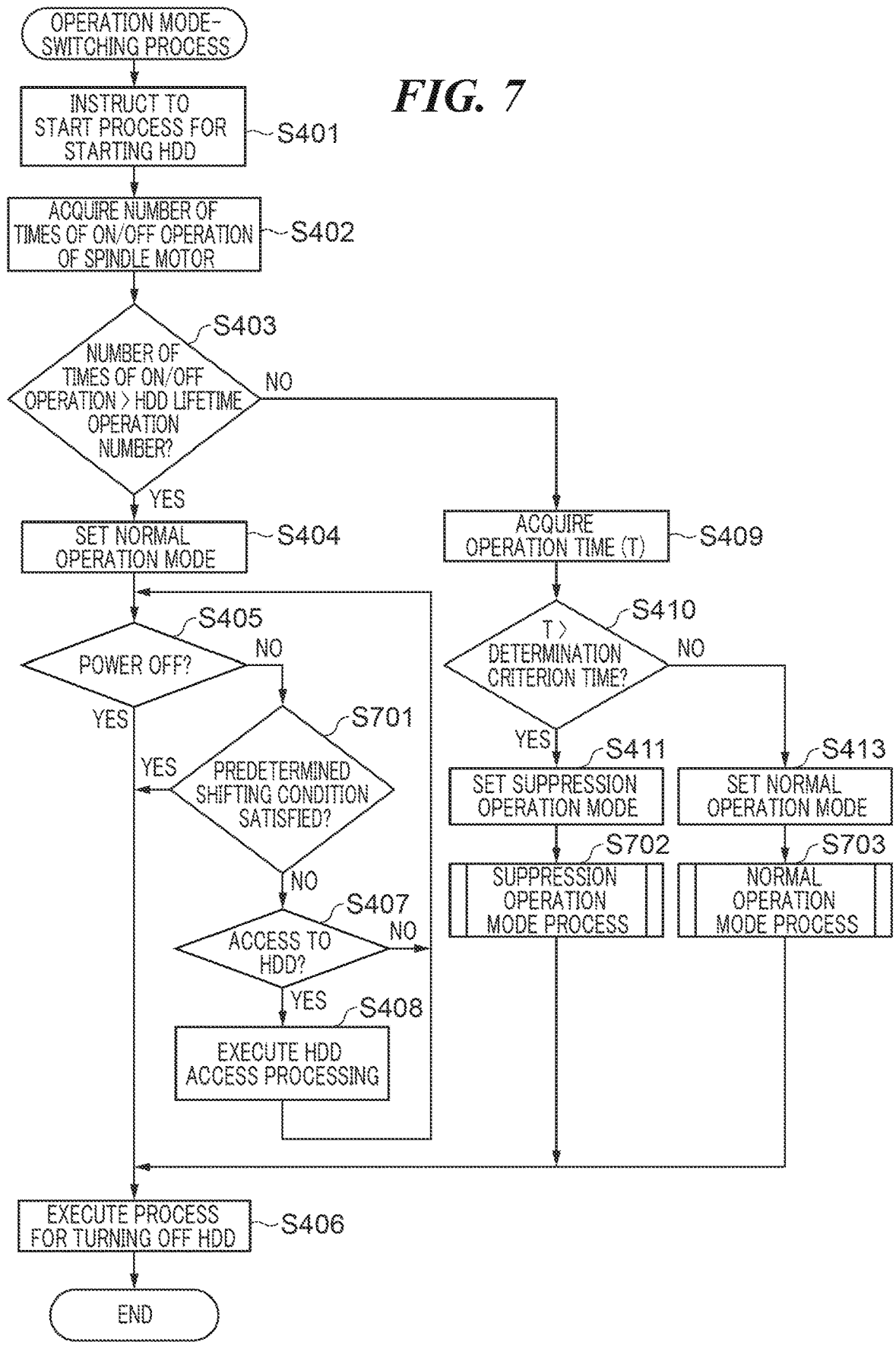
FIG. 7 is a variation of the operation mode-switching process in FIG. 4.

FIG. 7 is a variation of the operation mode-switching process in FIG. 4. The process in FIG. 7 is also performed by the CPU 102 that executes an associated program stored in the ROM 103. The process in FIG. 7 is also executed when electric power is supplied to the HDD 111. Note that in the process in FIG. 7, it is assumed that the image forming apparatus 100 is shifted to the deep sleep state when the above-mentioned predetermined shifting condition is satisfied.

Referring to FIG. 7, the CPU 102 executes the steps S401 to S403. If it is determined in the step S403 that the acquired number of times of ON/OFF operation of the spindle motor 206 exceeds the HDD lifetime operation number, the CPU 102 executes the steps S404 and S405.

If it is determined in the step S405 that the user has provided an instruction for turning off the image forming apparatus 100, the CPU 102 executes the step S406 et seq. If it is determined in the step S405 that the user has not provided an instruction for turning off the image forming apparatus 100, the CPU 102 determines whether or not the above-mentioned predetermined shifting condition is satisfied (step S701).

If it is determined in the step S701 that the predetermined shifting condition is satisfied, the CPU 102 executes the step S406 et seq. If it is determined in the step S701 that the predetermined shifting condition is not satisfied, the CPU 102 executes the step S407 et seq.

If it is determined in the step S403 that the number of times of ON/OFF operation of the spindle motor 206 does not exceed the HDD lifetime operation number, the CPU 102 executes the steps S409 and S410.

If it is determined in the step S410 that the operation time (T) of the image forming apparatus 100 exceeds the determination criterion time, the CPU 102 executes the step S411, performs a suppression operation mode process, described hereinafter with reference to FIG. 8 (step S702), and executes the step S406 et seq.

If it is determined in the step S410 that the operation time (T) of the image forming apparatus 100 does not exceed the determination criterion time, the CPU 102 executes the step S413, performs a normal operation mode process, described hereinafter with reference to FIG. 9 (step S703), and executes the step S406 et seq.

Figure 8:
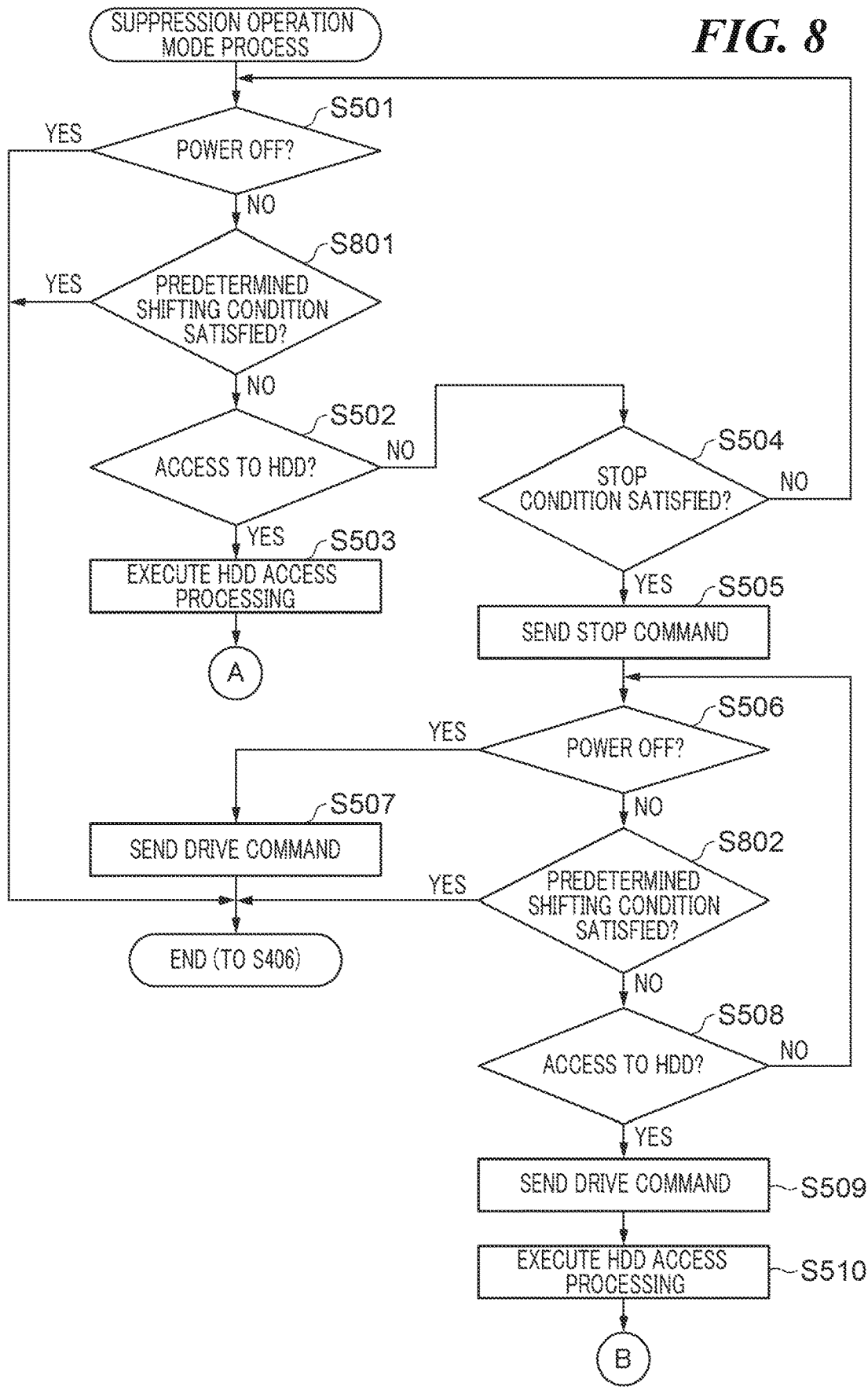
FIG. 8 is a flowchart of a suppression operation mode process in a step in FIG. 7.

FIG. 8 is a flowchart of the suppression operation mode process in the step S702 in FIG. 7. The process in FIG. 8 differs from the suppression operation mode process in FIG. 5 only in some of the steps, and hence the following description is given only of the different steps.

Referring to FIG. 8, the CPU 102 executes the step S501. If it is determined in the step S501 that the user has provided an instruction for turning off the image forming apparatus 100, the CPU 102 executes the step S406 et seq. If it is determined in the step S501 that the user has not provided an instruction for turning off the image forming apparatus 100, the CPU 102 determines whether or not the above-mentioned predetermined shifting condition is satisfied (step S801).

If it is determined in the step S801 that the predetermined shifting condition is satisfied, the CPU 102 executes the step S406 et seq. If it is determined in the step S801 that the predetermined shifting condition is not satisfied, the CPU 102 executes the step S502.

If it is determined in the step S502 that the CPU 102 is to access the HDD 111, the CPU 102 executes the step S503 et seq. If it is determined in the step S502 that the CPU 102 is not to access the HDD 111, the CPU 102 executes the steps S504 to S506.

If it is determined in the step S506 that the user has provided an instruction for turning off the image forming apparatus 100, the CPU 102 executes the step S507 et seq. If it is determined in the step S506 that the user has not provided an instruction for turning off the image forming apparatus 100, the CPU 102 determines whether or not the above-mentioned predetermined shifting condition is satisfied (step S802).

If it is determined in the step S802 that the predetermined shifting condition is satisfied, the CPU 102 executes the step S406 et seq. If it is determined in the step S802 that the predetermined shifting condition is not satisfied, the CPU 102 executes the step S508 et seq.

Figure 9:
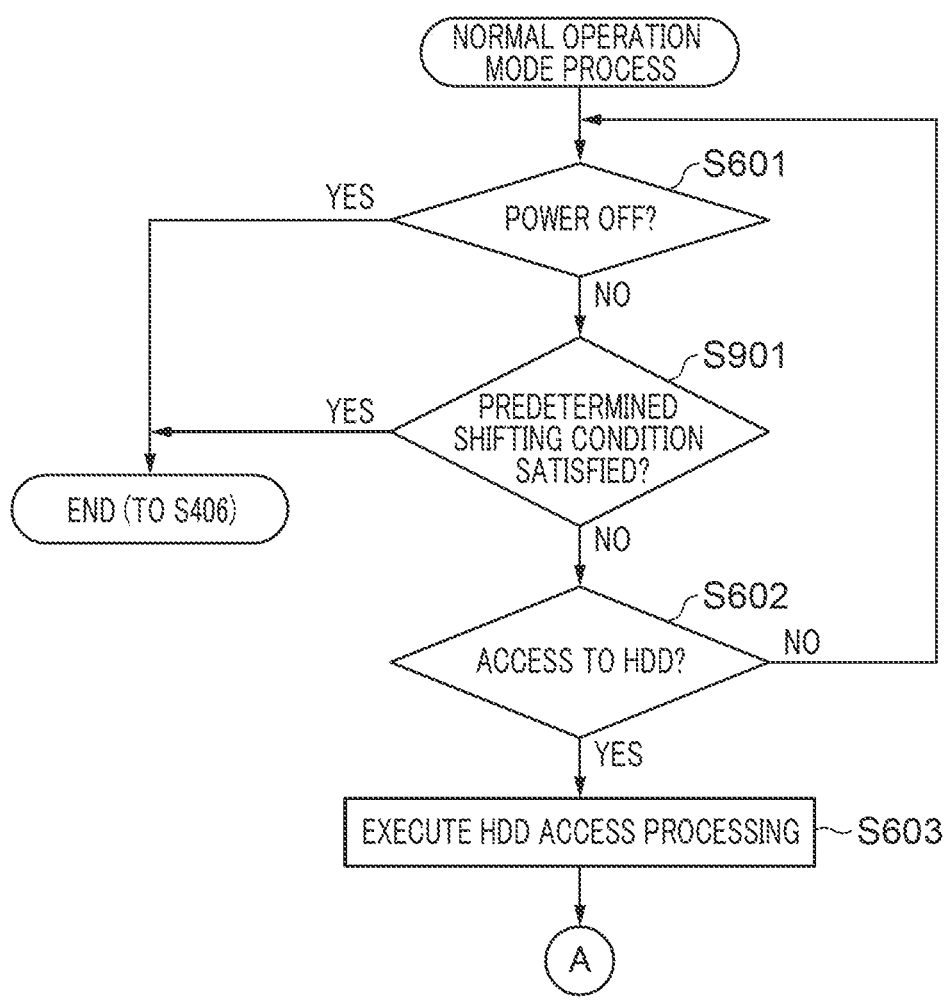
FIG. 9 is a flowchart of a normal operation mode process in a step in FIG. 7.

FIG. 9 is a flowchart of the normal operation mode process in the step S703 in FIG. 7. The process in FIG. 9 differs from the normal operation mode process in FIG. 6 only in one of the steps, and hence the following description is given only of the different step.

Referring to FIG. 9, the CPU 102 executes the step S601. If it is determined in the step S601 that the user has provided an instruction for turning off the image forming apparatus 100, the CPU 102 executes the step S406 et seq. If it is determined in the step S601 that the user has not provided an instruction for turning off the image forming apparatus 100, the CPU 102 determines whether or not the above-mentioned predetermined shifting condition is satisfied (step S901).

If it is determined in the step S901 that the predetermined shifting condition is satisfied, the CPU 102 executes the step S406 et seq. If it is determined in the step S901 that the predetermined shifting condition is not satisfied, the CPU 102 executes the step S602 et seq.

In the above-described processes in FIGS. 7 to 9, it is possible to obtain the same advantageous effects as provided by the processes in FIGS. 4 to 6.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-247763 filed Dec. 28, 2018, which is hereby incorporated by reference herein in its entirety.

What is claimed is:

1. A storage control apparatus equipped with a storage device including a magnetic disk and a control motor for rotating the magnetic disk, the storage control device comprising:
a controller including one or more processors that implements instructions stored in one or more memories to:
the number of times of ON/OFF operation of the control motor; and
switch an operation mode of the storage device to one of a first mode for suppressing a total rotation time of the control motor or a second mode for suppressing the number of times of ON/OFF operation of the control motor, based on the acquired number of times of ON/OFF operation of the control motor.

2. The storage control apparatus according to claim 1, wherein the storage control apparatus is an image forming apparatus that executes a job involving an image formation process.

3. The storage control apparatus according to claim 1, wherein:
in a case where the first mode is set, the control motor is stopped when a predetermined stop condition, set in advance, is satisfied, and
in a case where the second mode is set, the control motor continues to be driven as long as electric power is supplied to the storage device.

4. The storage control apparatus according to claim 1, wherein the controller switches the operation mode of the storage device to one of the first mode or the second mode, based on a threshold value regarding a lifetime of the operation of the storage control apparatus, the threshold value being based on the number of times of ON/OFF operation of the control motor.

5. The storage control apparatus according to claim 4, wherein the controller acquires the threshold value corresponding to the number of times of ON/OFF operation of the control motor.

6. The storage control apparatus according to claim 4, wherein the controller further:
acquires an operation time of the storage control apparatus; and
sets, in a case where the acquired operation time exceeds the threshold value, the operation mode of the storage device to the first mode.

7. The storage control apparatus according to claim 6, wherein the controller sets, in a case where the operation time the threshold value or less, the operation mode of the storage device to the second mode.

8. The storage control apparatus according to claim 6, further comprising:
another memory; and
a clock circuit configured to acquire a current time and notify the controller of the acquired current time,
wherein the operation time of the storage control apparatus is a time calculated based on time information of a first job stored in the another memory and the time notified by the clock circuit.

9. A method of controlling a storage control apparatus equipped with a storage device including a magnetic disk and a control motor for rotating the magnetic disk, the method comprising:
acquiring the number of times of ON/OFF operation of the control motor; and
switching an operation mode of the storage device to one of a first mode for suppressing a total rotation time of the control motor or a second mode for suppressing the number of times of ON/OFF operation of the control motor, based on the acquired number of times of ON/OFF operation of the control motor.

10. A non-transitory computer-readable storage medium storing a computer-executable program executable by a computer to execute a method of controlling a storage control apparatus equipped with a storage device including a magnetic disk and a control motor for rotating the magnetic disk, the method comprising:
acquiring the number of times of ON/OFF operation of the control motor; and
switching an operation mode of the storage device to one of a first mode for suppressing a total rotation time of the control motor or a second mode for suppressing the number of times of ON/OFF operation of the control motor, based on the acquired number of times of ON/OFF operation of the control motor.

* * * * *